United States Patent [19]
Chesser et al.

[11] 3,762,485

[45] Oct. 2, 1973

[54] PROCESS FOR THE PREVENTION OF BALLING

[75] Inventors: Billy G. Chesser; Floyd Lee Allen, both of Houston, Tex.

[73] Assignee: Milchem Incorporated, Houston, Tex.

[22] Filed: Sept. 5, 1972

[21] Appl. No.: 286,288

[52] U.S. Cl.............. 175/65, 166/305 R, 175/64, 175/72, 252/8.5 A
[51] Int. Cl............................................. E21b 21/04
[58] Field of Search................. 166/305 R; 175/64, 175/65, 68, 72; 252/8.5 A

[56] References Cited
UNITED STATES PATENTS

| | | | |
|---|---|---|---|
| 2,771,421 | 11/1956 | Browning | 252/8.5 |
| 2,841,222 | 7/1958 | Smith | 166/305 R |
| 2,896,915 | 7/1959 | Weiss et al. | 175/72 |
| 2,999,551 | 9/1961 | Murphy | 175/68 |
| 3,107,739 | 10/1963 | Mathews | 175/72 |
| 3,318,396 | 5/1967 | Tailleur | 175/72 |
| 3,382,924 | 5/1968 | Veley et al. | 166/305 R |
| 3,621,913 | 11/1971 | Braden | 166/305 R |
| 3,692,125 | 9/1972 | Ruhle | 175/65 |

Primary Examiner—Marvin A. Champion
Assistant Examiner—Jack E. Ebel
Attorney—Bertram H. Mann et al.

[57] ABSTRACT

A process for the prevention of balling while drilling subterranean wells wherein the surface of drilling equipment is exposed to an aqueous circulating system having present therein a polyvalent metal ion, said ion being complexed by an organic complexing component, all as hereinafter described.

6 Claims, 9 Drawing Figures

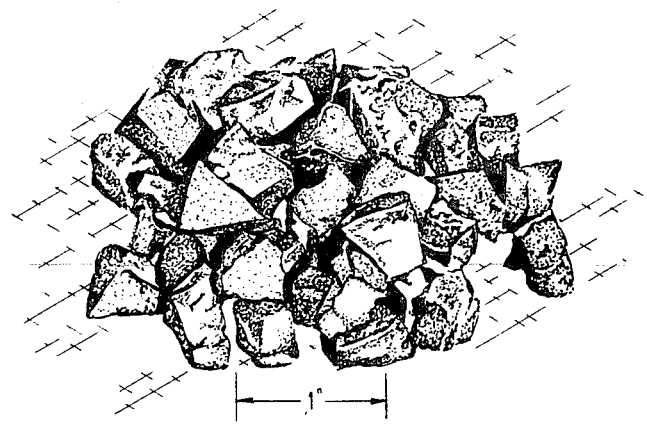
Fig_1
Fig_2
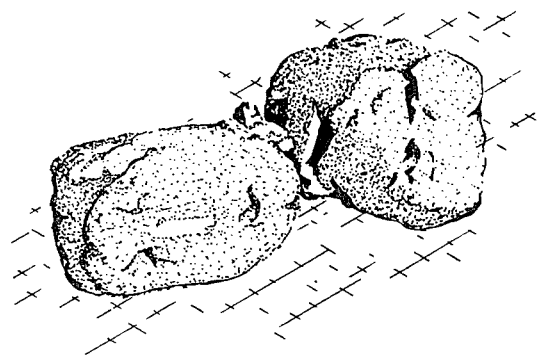
Fig_3

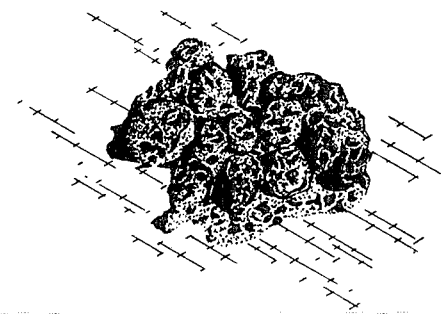
Fig-4
Fig-5
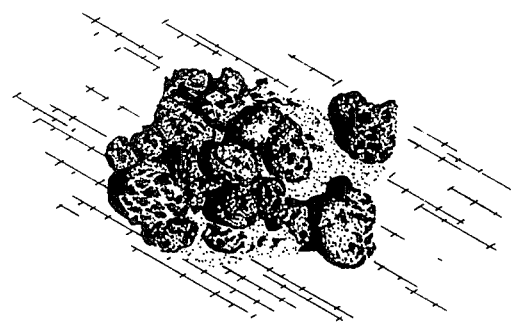
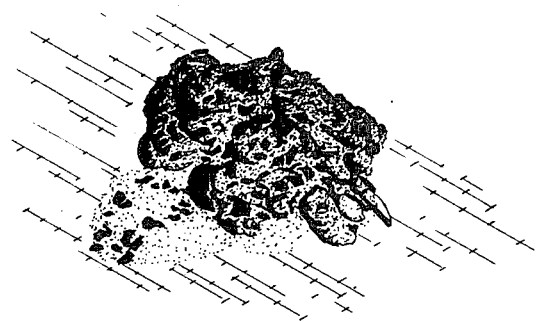
Fig-6

PROCESS FOR THE PREVENTION OF BALLING

BACKGROUND OF THE INVENTION

1. Field of the Invention

The invention relates to a process for the prevention of balling during drilling, workover and completion of subterranean oil and gas wells.

2. Description of The Prior Art

When drilling, working over or completing subterranean wells in order to tap deposits of, for example, oil or gas, and in particular when utilizing a rotary drilling method comprising a bit to which is attached a drill stem, the bit will penetrate the formation. The formation is composed of both organic and inorganic substances such as minerals, clays and the like. Most of these materials will hydrate when exposed to aqueous environments. Additionally, some of these materials possess the property of hydrodynamic volume increase during hydration, sometimes referred to as "swelling." These materials will hereafter be referred to as "formation cuttings."

As the drill bit teeth penetrate the formation, drill chips are generated by the action of the bit. These drill chips are wetted by the drilling fluid producing sticky, plastic particles. The formation cutting will become more kneaded until the liquid content of the drilling fluid causes it to become a mass varying from a stiff putty-like material to a sticky paste. Continued agglomeration of these drilled chips upon the surface of the bit will result in "balling" i.e., a collected mass of sticky, tacky material that interferes with the cutting action of the bit teeth and, among other complications and adverse effects, greatly reduces penetration rates. Balling also occurs on drill collars and stabilizers further interfering with drilling operations. Balling will also result in plugging of the surface flow line, interference with the proper operation of flow meters, and the like (all hereinafter referred to for convenience as "drilling equipment").

Although jet action cleaning of the bits and cleaning processes for surface drilling equipment offers some relief, it would be desirable to eliminate the cause of balling rather than treating the result.

We have found that the exposure of certain polyvalent metal cations to the surface of drilling equipment during drilling operations will provide a means to eliminate the balling tendency of both formation cuttings as well as additives utilized in the drilling fluid. As a result, these solids will not collect on the equipment surface.

It is, therefore, an object of the present invention to provide a process for the prevention of balling of formation cuttings on drilling equipment.

Other objects and advantages of the present invention will be apparent from a reading of the specification, figures and claims which follow.

SUMMARY OF THE INVENTION

According to the present invention, balling of kneaded formation cuttings is eliminated by a process incorporating a complexed polyvalent metal ion. The use of the present invention is effective for the prevention of balling on drilling equipment at the surface and in the bore hole.

DESCRIPTION OF THE PREFERRED EMBODIMENTS

Although not fully understood, it is believed that the polyvalent metal complexes retard or inhibit the hydration of the majority of formation cuttings whereby most of the particles remain cohered or "cemented" and essentially in their original size and shape. The metal complexes prevent kneading of both hydratable and non-hydratable formation cuttings thereby eliminating the formation of tacky and sticky putty-like materials.

A factor involved in the use of polyvalent metal ions is their precipitation as hydrous oxides in alkaline environments. Thus the ion must be reacted in such a fashion so that its normal tendency to precipitate out of solution is either entirely eliminated or greatly reduced. Such a result can be achieved by reacting the ion to form a complex.

Although many organic materials may be utilized to form the complex, we prefer to initially use an organic acid as an alkali metal or ammonium salt thereof. Preferably, a starting material selected from the class consisting of acetic, citric, formic, lactic, oxalic and tartaric acids, the alkali metal and ammonium salts and mixtures thereof will be used.

By polyvalent metal ion, we mean to refer to and claim metallic ions having a valence of at least 2 which normally precipitate out of alkaline aqueous solutions at increased pH's if not complexed. For example, the following metals can be used in the present process:

| METAL SERIES | VALENCE |
| --- | --- |
| Aluminum | 3 |
| Bismuth | 3, 5 |
| Chromium | 2, 3 |
| Cobalt | 2, 3 |
| Copper | 2 |
| Iron | 2, 3 |
| Lanthanum | 3 |
| Magnesium | 2 |
| Nickel | 3 |
| Tin | 2, 4 |
| Titanium | 3, 4 |
| Zinc | 2 |
| Zirconium | 3, 4 |

A complex may be prepared in an aqueous solution by subjecting the selected polyvalent metal ion to a sufficient quantity of the complexing component. Preferably, the metal ion is utilized in the form of a water soluble salt such as chromium sulfate, aluminum sulfate, aluminum chloride, or the like. The metal ion may be used in a solid state or in a hydrated form. When utilizing an anhydrous metal ion starting material, the reaction may be preferably conducted in an aqueous system. Catalytic heat may be required to increase the kinetics of the reaction. However, the reaction will go to completion at ambient temperature. After dissolving the metal ion in solution, and, if utilized, after the addition of heat, the complexing component is added and heated or allowed to stabilize for a short period of time (generally about 15 to 45 minutes) to form the complex. The solvent is then removed by methods ordinarily known to those skilled in the art, such as by vacuum drying and the like. The resulting material may then be ground to provide a high surface area product.

In preparation of the material utilized in the present invention, it is not necessary that it be prepared in solution. When utilizing a non-solvent preparation system, the metal ion material may be simply blended with the complexing component. This preparation will normally not require use of catalytic heat.

As discussed above, the function of the complexing component is to complex the metal ion so that it will not precipitate out of solution in alkaline media. Generally speaking, a 1-to-1 equivalent weight ratio of metal ion to complexing component is preferred. An excess of complexing component may be successfuly used. Ratios of reactants below 1-to-1 on an equivalent weight basis may also be utilized. For example, when aluminum sulfate is used to supply the metal ion, it has been found that the metal ion may be complexed with, for example, citric, oxalic and tartaric acids in equivalent weight ratios as low as 1-to-0.2 to provide a complex that will prevent the metal ion from precipitating out of solution in alkaline environments. Generally speaking, any ratio of metal ion to complexing component which will prevent precipitation of the metal ion in alkaline environments may be used. As exact minimum cannot be given for all metals with each complexing component because of many factors and variables which may enter into the reaction of the complex with the formation cuttings. The selection of the particular metal ion and its form will greatly vary the necessary amount of complexing component required to form the resulting complex. Also, the selected complexing component will be a factor. Additionally, the particular alkaline environment in which the complex is utilized must be considered. However, since the object of using a complexed structure is to provide sufficient metal ion for the purpose of prevention of balling, titration and related testing procedures can be used to determine the amount of metal ion which is adsorbed by the formation particles and drilling fluid additives. Samples of solids in the selected environment may be separated into at least two specimens. The first specimen should not be exposed to a complex and should serve as a base, blank or check. The second or succeeding samples should be exposed to several concentrations of complexes prepared at varying equivalent weight ratios of the selected metal ion to complexing component. By visual observation and balling tests as, for example, used in the Examples below, a determination can be made of the particular complex and concentration thereof to be utilized to prevent balling. In actual drilling operations, we have found that initial concentrations of the complex in the range of from between 1 pound per 42 gallon barrel (hereinafter referred to simply as "p.p.b.") and about 10 p.p.b. will be sufficient to prevent balling under most circumstances. Thereafter, a titration test can be utilized to determine the amount of metal ion material which will be necessary to replenish the adsorbed ion. For example, see Furman, *Scott's Standard Method of Chemical Analysis*, Vol. 1, Sixth Edition, p. 50 (Van Nostrand Company, Inc., March, 1962). Where the presence in the aqueous system of any material which would color the system and render such a test inapplicable, the following modification could be utilized:

1. Pipette a 3.0 to 10.0 ml. sample of aqueous medium into a 250 ml. beaker. The medium is then made acidic with hydrochloric acid, boiled for several minutes and diluted to approximately 150 ml.

2. Add 20 ml. of 30 percent sodium potassium tartrate solution.

3. Adjust the pH of the sample to 8.3 with 0.02N NaOH using a pH meter to determine the end point which is reached when, after the addition of one drop of 0.02N NaOH, the sample pH remains constant at 8.3 for 1 minute.

4. Add 20 ml. of 20 percent sodium potassium fluoride solution and stir the sample for 5 minutes.

5. Back titrate the sample to pH 8.3 with 0.02N HCl using a pH meter to determine the end point which is reached when, after the addition of one drop of 0.02N HCl, the sample pH remains constant for 1 minute.

In the case of aluminum, the metal content of the sample, calculated as grams of complex per ml. solution, is equal to:

$(ml_{HCl} \times N_{HCl})(8.9938)/(Vol.\ sample,\ ml.)(F)(1000)$ where $F = \%$ by weight of metal ion in the complex expressed as a decimal fraction.

The process of the present invention encompasses the following steps:

A. Preparing an aqueous system;

B. Adding to said system a polyvalent metal ion;

C. Complexing the polyvalent metal ion in the aqueous system with a complexing component selected from the class consisting of acetic, citric, formic, lactic, oxalic and tartaric acids, the alkali metal and ammonium salts and mixtures thereof;

D. Adjusting the pH of the system to at least as high as 7.0;

E. Circulating the system into, throughout and out of a subterranean bore hole;

F. Contacting formation cuttings with the complexed metal ion in the circulating system.

Step "D" may also be done in conjunction with Step "A."

The aqueous system can be either fresh water, a brine, sea water or any combinations thereof. The aqueous system may also contain other known drilling fluid additives such as bentonite, barite, ethoxylated organic polymers, asbestos, gums, polymers and similar viscosity modifying agents, and chemical thinners.

The polyvalent metal ion may be added to the aqueous system in the manner described herein or added in combination with and to other drilling materials. Preferably the material, either alone or in combination is added during normal mixing operations in the mud pits. Complexing of the metal ion will normally occur instantly upon addition of the complexing component.

The following Examples further illustrate the present invention:

EXAMPLE 1

A base mud was prepared containing 10 p.p.b. of prehydrated sodium bentonite and 0.5 p.p.b. carboxymethylcellulose in tap water. Samples of the base mud were treated with 5 p.p.b. gypsum, 10.5 p.p.b. potassium chloride, 14.0 p.p.b. Neptune sea salt, and 5 p.p.b. of an aluminum sulfate-citric acid complex in a 1-to-1 equivalent weight ratio, respectively. The samples were aged for about 16 hours at 150° F in a roller oven. The concentration of the complex in the filtrate was determined to be 2.2 p.p.b. after "hot rolling," and an additional 2.8 p.p.b. of the complexed metal ion material was added to the sample to maintain a 5 p.p.b. available concentration. Formation "pellets" were prepared from a core sample obtained from an oil well drilling operation near Eugene Island off the coast of Louisiana by subjecting the shale to 6,000 p.s.i. pressure in a Carver Press. The pellets were cut into fragments, added to the samples and hot-rolled for one hour. After hot-rolling the samples were removed, screened through a standard mesh window screen and photographed at magnification for comparison. The results of this test are indicated in FIGS. 1–6.

BRIEF DESCRIPTION OF FIGS. 1 THROUGH 6

FIG. 1 shows the formation pellets after subjection to pressure and thereafter cut up to simulate formation cuttings.

FIG. 2 shows the cuttings in the base mud after testing. Note the clearly apparent balling of the cuttings.

FIG. 3 shows the cuttings exposed to the sample treated with the metal ion complex. The large gummy mass material seen in FIG. 2 is not apparent.

FIG. 4 shows results obtained with a gypsum treatment. Here, although the cuttings may be in a somewhat dispersed state, there is still agglomeration.

FIG. 5 shows results obtained with potassium chloride. Here, more dispersion is apparent than in FIG. 4.

FIG. 6 shows treatment with Neptune sea salt. Agglomeration and dispersion are apparent.

EXAMPLE II

Figure 7:
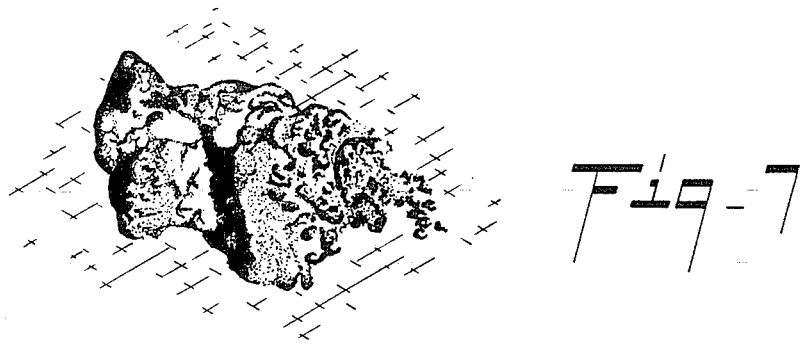
Figure 8:
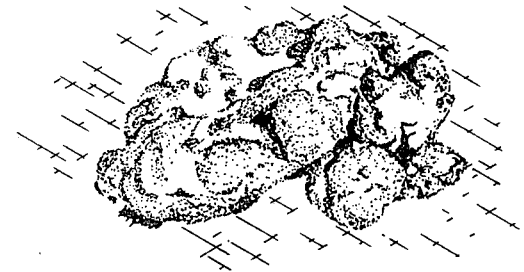
Figure 9:

The procedure outlined in Example 1 was followed but the compaction pressures were reduced to 4,000 p.s.i. to determine the ability of the complex to prevent balling of a softer formation cutting. The results indicated that the complex was effective in preventing balling of the cuttings. FIGS. 7–9 illustrate the test results.

BRIEF DESCRIPTION OF FIGS. 7 THROUGH 9

FIG. 7 is illustrative of the base mud after testing. Note the agglomeration of the material.

FIG. 8 is a drawing showing the mud containing gypsum. Here, although there has been some breakdown of the material, it is evident that there is essentially one mass of material.

FIG. 9 is a drawing of the mud containing the complexed material. Note the lack of cutting agglomeration.

EXAMPLE III

The procedure utilized in Example I was used with the following metal ion complexes:

1. Aluminum sulfate-tartaric acid (1.0/0.5 equivalent weight ratio)
2. Aluminum sulfate-potassium bitartrate (1.0/0.5 equivalent weight ratio)
3. Ferric Chloride-citric acid (1.0/1.0 equivalent weight ratio)
4. Lanthanum Nitrate-citric acid (1.0/1.0 equivalent weight ratio)
5. Aluminum Sulfate-sodium citrate (1.0/1.0 equivalent weight ratio)

All samples satisfactorily demonstrated the ability to prevent balling of the formation cuttings.

EXAMPLE IV

A test was initiated during drilling operations at an offshore Louisiana platform. The following aqueous drilling fluid (system) was prepared using drill water from the well while drilling the conductor hole:

1. 20 p.p.b. sodium bentonite
2. 0.5 p.p.b. sodium hydroxide
3. 3 p.p.b. chrome lignosulfonate
4. 5 p.p.b. aluminum sulfate-citric acid complex (1-to-1 equivalent weight ratio)
5. 0.7 p.p.b. carboxymethylcellulose
6. Barite added to provide 10.5 p.p.g. system.

The pH of the mud was adjusted from 6.5 to approximately 8.5. A fresh water-gel drilling fluid was displaced in the conductor hole by the above described aqueous fluid.

The complex prevented bit balling and no plugging of the flow line occurred during drilling operations. Additionally, no drag on the drill string or tight spots was noted. After the surface hole was completed, the bit was pulled off the bottom of the hole with no drag. It was noted that the drill collars and bit were essentially free of balling. No balling or accumulation upon the shaker screens was noted as the aqueous drilling fluid was circulated onto and through the drilling equipment.

Similar drilling operations in this area had a history of balling problems on all drilling equipment when the metal ion complex was not utilized.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A process for the prevention of balling of formation cuttings upon the surface of drilling equipment used in conjunction with the drilling, workover, and completion of a subterranean well, comprising the steps of:
   A. Preparing an aqueous system;
   B. Adding to said system a polyvalent metal ion, said ion being complexed with a complexing component selected from the class consisting of acetic, citric, formic, lactic, oxalic and tartaric acids, the alkali metal and ammonium salts and mixtures thereof;
   c. Adjusting the pH of the system to at least as high as 7.0;
   D. Circulating the system into, throughout and out of a sub-terranean bore hole;
   E. Contacting formation cuttings with the complexed metal ion in the circulating system.

2. The process of claim 1 wherein the polyvalent metal ion is aluminum.

3. The process of claim 1 wherein the complexing component is citric acid.

4. A process for the prevention of balling of formation cuttings upon the surface of drilling equipment used in conjunction with drilling, workover, and completion of a subterranean well, comprising the steps of:
   A. Preparing an aqueous alkaline system;
   B. Adding to said system a polyvalent metal ion, said ion being complexed with a complexing component selected from the class consisting of acetic, citric, formic, lactic, oxalic and tartaric acids, the alkali metal and ammonium salts and mixtures thereof;
   C. Circulating the system into, throughout and out of a subterranean bore hole;
   D. Contacting formation cuttings with the complexed metal ion in the circulating system.

5. The process of claim 4 wherein the polyvalent metal ion is aluminum.

6. The process of claim 4 wherein the complexing component is citric acid.

* * * * *